United States Patent [19]

Harakal et al.

[11] Patent Number: 5,298,060
[45] Date of Patent: Mar. 29, 1994

[54] USE OF SILICONE RESINS AND FLUIDS TO RETARD MARINE LIFE BUILDUP ON SUBMERGED SURFACES

[75] Inventors: Mark E. Harakal, Hamburg; Dieter R. Nollen, Ahrensburg, both of Fed. Rep. of Germany

[73] Assignee: Air Products and Chemicals, Inc., Allentown, Pa.

[21] Appl. No.: 862,875

[22] Filed: Apr. 3, 1992

[51] Int. Cl.$^5$ .............................................. C09D 5/14
[52] U.S. Cl. ........................... 106/15.05; 106/18.32; 106/18.35; 424/78.09; 424/405; 427/387; 427/393; 514/63; 523/122; 524/261; 524/264
[58] Field of Search ............. 106/15.05, 18.32, 18.35; 71/67; 424/405, 78.09; 514/63; 427/387, 393; 523/122; 524/261, 264

[56] References Cited

U.S. PATENT DOCUMENTS 4,354,873  10/1982  Supcoe et al. ................... 106/18.32
4,500,337   2/1985  Young et al. .................... 106/15.05

OTHER PUBLICATIONS

R. F. Brady, J. R. Griffith, K. S. Love and D. E. Field, "Nontoxic Alternatives to Antifouling Paints" Journal of Coatings Technology, vol. 59, No. 755, Dec. 1987.

*Primary Examiner*—Anthony Green
*Attorney, Agent, or Firm*—Michael Leach; James C. Simmons; William F. Marsh

[57] ABSTRACT

A method for preventing or reducing the marine life buildup on a submerged surface by applying to the surface an antifouling coating composition comprising a combination of a silicone fluid and a silicone resin.

16 Claims, No Drawings

5,298,060

USE OF SILICONE RESINS AND FLUIDS TO RETARD MARINE LIFE BUILDUP ON SUBMERGED SURFACES

FIELD OF THE INVENTION

The present invention relates to coating compositions applied to submerged surfaces, particularly those coatings applied to the submerge sections of maritime vessels to prevent buildup of "sea growth".

BACKGROUND OF THE INVENTION

Maritime vessels require a coating on the submerged section of the vessel to prevent buildup of "sea growth", including algae, larvae, and spores from marine animals and plants. The accumulation of this type of growth on the vessel results in an increase in friction, i.e., greater surface area, between the hull and the surrounding water. Increased friction will be manifested by slower movement and increased energy consumption to propel the vessel through the water. Buildup of growth on a ship hull occurs most often when the ship is docked or moored, particularly in marinas or ports where water is not moving and thereby containing a higher concentration of marine organisms.

This buildup is obviously undesirable and the coatings normally employed by the industry to reduce or prevent marine life buildup up are called "antifouling paints". These paints contain inorganic and organic compounds that slowly leach out of the coating into the water surrounding the hull. The active components of the antifouling paints are typically heavy metal sulfides or oxides of nickel, manganese, iron, zinc, cadmium, cobalt, lead and mercury. Organic tins or pesticides are often included within the coating substrate. These heavy metals leach out of the ship coating forming a thin, highly concentrated laminar layer several microns thick surrounding the ship hull. The high percentage of the thousands of types of microorganisms that come in contact with this environment are killed by the complexation of these heavy metals with their proteins and enzymes. Any microorganism or animal that does succeed in attaching to the hull may eventually die after continued exposure to these purported toxins. Over time many of the heavy metals such as tin will hydrolyze and slough off with the top layers of the coating, taking with them any attached dead marine growth. This procedure results in a freshly exposed coating surface with more toxins able to leach from the surface. The antifouling coating must be reapplied new to the hull of a ship at the beginning of every boating season. The effective life of the coating is typically 9 to 12 months.

The problem confronting the industry is that the antifouling paints by the very nature of their efficacy contain materials that are considered to be toxic to the marine environment. Marine organisms and micro- organisms that have died as a result of the interference of these heavy metals with their metabolic pathways will be passed into the food chain in the marine environment.

This problem is most evident in small inlet waterways, lakes and streams where bottom samples and fish samples have shown increasingly high levels of these inorganic materials in recent years. Many of these waterways used for recreational boating activities also serve as reservoirs for potable water. Legislation has been proposed in many countries limiting or banning the use of antifouling paints in freshwater and sweetwater areas.

All maritime paints used as coatings for ship hulls contain these organic and inorganic substances as part of their antifouling mechanisms. Other types of technology have been introduced to reduce marine buildup on piers and oil platform pilings; these silicone rubbers and elastomers although reducing buildup have proved difficult to clean, which make them unusable as coating materials for boats. With the proposed restriction and potential banning on conventional antifouling paints, new technologies must be developed to fulfill the demanding requirements of this application. To date, no viable technologies have been introduced to the market as a potential replacement for inorganic and organic containing antifouling coatings.

SUMMARY OF THE INVENTION

The present invention uses a silicone containing composition as a coating on a submerged substrate to reduce the buildup of marine life. The coating is a combination of a silicone fluid and a silicone resin used neat or solubilized in a conventional carrier solvent that evaporates when the coating is applied by spraying or painting onto the substrate surface, especially the hull of a ship or boat. The silicone resin and the silicone fluid may also be used individually but are most effective in combination.

The use of silicone resins in combination with silicone fluids provides for a dual function in reducing the buildup of spores and larvae from marine animals and plants on submersed substrates such as boat hulls and pier pilings. The silicone resin is a three dimensional, crosslinked, trifunctional siloxane that forms a solid continuous coating when applied, for example, to a boat hull. The silicone fluid typically is a polymeric difunctional siloxane, interspersed within the resin layer in such a manner that it leaches out over time to provide a liquid laminar layer surrounding the boat hull that is difficult for marine micro- and macroorganisms to attach to. The effect of this dual mechanism is a reduction in buildup and a coating that is extremely easy to clean. This coating is effective over many months and effectively replaces current antifouling coatings that use heavy metal toxins as part of their mechanism for killing marine organisms and preventing buildup.

DETAILED DESCRIPTION OF THE INVENTION

In this invention a silicone resin is used preferably in combination with a silicone fluid to prevent the buildup of organic marine growth on a submersed substrate such as a boat hull or pier piling.

The silicone fluid used in the silicone containing antifouling composition can take the form of a low to high molecular weight linear polymeric siloxane having a viscosity ranging from 10 to 500,000 mPas (cps), preferably 100 to 1000 mPas, of the following general structure I

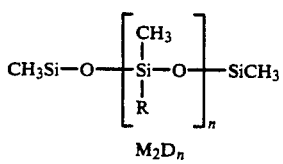

$M_2D_n$     I where R is an organo group such as $C_1$–$C_5$ alkyl, for example, methyl and ethyl, vinyl or $C_6$ aryl, for example, phenyl, and n can range from 2 to 1500, preferably 90 to 800. Desirably for this invention, R is methyl or phenyl and the molecular weight ranges (as described in terms of viscosities) that are typically used are 10 to 3500 mPas (cps), preferably 100 to 1000 mPas (cps). Such silicone fluids suitable for use in the invention are commercially available under the AK or AS trademark from Wacker-Chemie or under the DC trademark from Dow Corning. Examples include AK 100, AK 350, AK 500, AS 100, AS 200, DC 200 and DC 350.

It is also possible to use as the silicone fluid in this invention low molecular weight branched silicones of structure II having viscosities ranging from 20 to 5000 mPas, preferably 50 to 200 mPas,

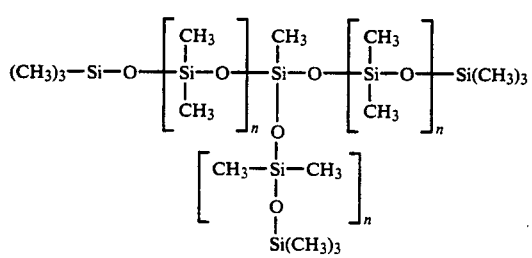

II where n ranges from 10 to 500, preferably 20 to 50.

Also suitable are functionalized fluids having viscosities ranging from 20 to 1000 mPas, preferably 50 to 500 mPas, as depicted in following formulas III and IV:

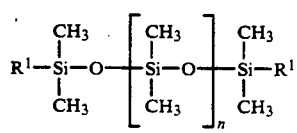

III

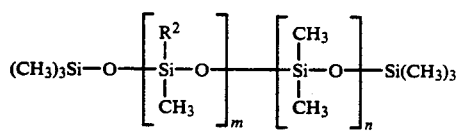

IV where $R^1$ is hydride, halide, $C_1$–$C_5$ alkyl, phenyl, benzyl, or a functionalized radical, such as, for example, organic groups having the following functionality: carboxyl [—$(CH_2)_3$—$CH(CO_2H)$—$CH_2CO_2$alkyl], hydroxyl [—$(CH_2)_3H$], mercapto [—$(CH_2)_3SH$], halo [—$C_6H_4Cl$], alkenyl [—$CH=CH_2$] [—$(CH_2)_3O_2CCH=CH_2$], amino [—$(CH_2)_3$—$NH$—$CH_2CH_2$—$NH_2$], isocyano [—$(CH_2)_3$—$O_2CNH$—$(CH_2)_4$—$NCO$], epoxy [—$(CH_2)_3$—$O$—$CH_2CH(O)CH_2$], or alkene oxide copolymer [—$(CH_2)_3O$—$(CH_2CH_2O)_n$—$(CH_2CH(CH_3)O)_mH$], preferably amino, isocyano or epoxy, and n ranges from 20 to 5000, especially 50 to 200; and where $R^2$ is hydride, halide, $C_1$–$C_5$ alkyl, phenyl, benzyl, or a functionalized radical such as, for example, organic groups having the following functionality: alkenyl [—$CH=CH_2$] [—$(CH_2)_3O_2CCH=CH_2$], halo [—$C_6H_4Cl$], isocyano [—$(CH_2)_3O_2CNH$—$(CH_2)_4$—$NCO$], or alkene oxide copolymer [—$(CH_2)_3O$—$(CH_2CH_2O)_n$—$(CH_2CH(CH_3)O)_mH$], preferably alkene oxide copolymer, phenyl or haloorganic and n ranges from 20 to 5000, preferably 20 to 500, and m ranges from 1 to 50, preferably 2 to 20.

Functionalized silicone fluids suitable for use in the invention are commercially available from Wacker-Chemie and Union Carbide. Examples include L-31 (silyl); L-77, L-720 (alkene oxide copolymer); A-186 and A-187 (epoxy); A-189 (mercapto); A-1100, A-1120, and A-1130 (amino); and A-151 and A-172 (vinyl).

It is also possible for the silicone fluid to take the form of a cyclic siloxane fluid of the following structure V $[(CH_3)_2SiO]_n$     V where n can be 3 to 8, preferably 3 to 5, and have viscosities ranging from 2 to 10 mPas, preferably 2 to 5 mPas. Such cyclic silicone fluids suitable for use in the invention are commercially available from Wacker-Chemie and Union Carbide Corp. Examples include ZO-20, ZO-10, VS 7158 and VS 7349.

The silicone fluids defined by structures I-V above can be used in the composition either individually or in combination with each other.

The silicone resin used in combination with the silicone fluid is a trifunctional siloxane where the trifunctional molecules are crosslinked randomly with other trifunctional or difunctional siloxanes to yield a three dimensional macromolecule of the general structure VI

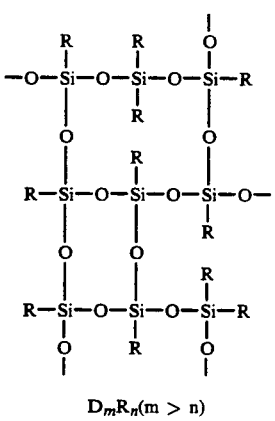

VI $D_mR_n (m > n)$ where R is methyl or ethyl, preferably methyl.

For the purpose of this invention the silicone resin is typically composed of crosslinked trifunctional molecules having the following formula VII

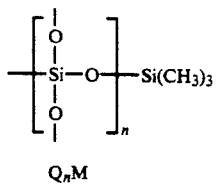

VII $Q_nM$ where the molar ratio of $(CH_3)_3Si/SiO_3$ ranges from 1.2 to 2.2, typically about 2. Such silicone resins suitable for use in the invention are commercially available as S-5 under the PURA trademark from Air Products and Chemicals PURA GmbH & Co., as Q2-3387 from Dow Corning and as VP-1038, VP-1076 and VP-1070 from Wacker-Chemie.

The effective operating composition of the invention can range from 100 wt % silicone resin to various ratios of resin to fluid and up to 100 wt %. of the silicone fluid, i.e., 0 to 100 wt % resin and 100 to 0 wt % fluid. The ratio of the resin to fluid is determined by the nature and composition of the resin and fluid components. An effective range of performance is obtained with from 5 to 40 wt % resin and 60 to 95 wt % fluid, preferably 10 to 25 wt % resin and 75 to 90 wt % fluid.

Suitable carrier solvents for the silicone mixture would include aliphatic and aromatic hydrocarbons, terpenes, alcohols, esters, ethers, ketones, ether-alcohols, halogenated hydrocarbons, volatile silicones and water. In addition, the silicone resin and/or silicone fluid can be blended with any other coating composition such as paints and applied to the substrate.

The silicone containing coating composition can be applied directly or indirectly to any substrate including metal, wood or plastics such as fiberglass, epoxy and the like. The best performance is achieved when the silicone containing coating is applied to a precoated substrate where the precoating is a smooth finish obtained with a polyurethane or epoxy coating.

The amount of the composition that is applied to the surface of the substrate depends upon whether the composition is applied by itself or as a component of another coating composition but it should result in applying from 5 to 15 $gm^2$ of the silicone components, i.e., silicone resin and/or fluid.

The two part silicone resin-silicone fluid composition is believed to be critical in the mechanism of reducing marine organic buildup. The silicone resin, a semi-solid material, from a continuous film on the substrate. Since this resin is a three dimensional material, the silicone fluid is interspersed within the resin matrix. The correct choice of silicone fluid is critical to the interspersion within this three dimensional matrix. If the compatibility is too low between the resin and fluid, the silicone fluid will form a discrete second layer on top of the silicone resin layer (bead up) and quickly wash away from the submerged substrate. Compatibility means the components should be phase soluble, i.e., the silicone resin should be soluble in the silicone fluid.

The best anti-growth activity will be achieved when there exists a high compatibility between the resin and fluid whereby the fluid gradually leaches out of the three dimensional matrix of the resin over time, thereby constantly reforming a micron thin laminar layer surrounding a submerged substrate. With the correct choice of resin and fluid, this leaching mechanism can be effected over many months in a submerged environment.

In the following examples the various antifouling coatings were rated on a scale of 1-5 (1 = best and 5 = worst) for buildup of marine life and ease of washing. The antifouling coatings were applied in an amount of 100 $ml/m^2$ to a polyurethane coated substrate which was then submerged in the indicated water environment. Typical commercially available antifouling coatings were evaluated against a blend of silicone resin and silicone fluid in a 1 to 6 wt ratio (resin:fluid). The silicone resin was PURA S-5 resin of formula VII and the fluid was Wacker-Chemic's AK 350 polydimethylsiloxane of formula I having a viscosity of about 100 mPas.

EXAMPLE 1

The antifouling coated panels were submerged in brackish tidal water containing plant spores, animal larvae and barnacles from March through September. Table 1 shows the evaluation results of the samples.

TABLE 1

|  | Acrylic Resin | None | Sil Resin/ Sil Fluid | Silicone Rubber | Epoxy Tar | Decomposable Paint | Paraffin | Wax Polish |
| --- | --- | --- | --- | --- | --- | --- | --- | --- |
| Build Up Rating | 3–4 | 5 | 2 | 3 | 5 | 5 | 2–3 | 4–5 |
| Wash Rating | 3 | 3 | 3 | 2 | 5 | 4 | 2 | 3 |

EXAMPLE 2

The antifouling coated panels were submerged in river inlet fresh water containing plant spores from March through October. Table 2 shows the evaluation results of the samples.

TABLE 2

|  | Acrylic Resin | None | Sil Resin/ Sil Fluid | Silicone Rubber | Epoxy Tar | Decomposable Paint | Paraffin | Wax Polish |
| --- | --- | --- | --- | --- | --- | --- | --- | --- |
| Build Up Rating | 3–4 | 5 | 1 | 3 | 4 | 4–5 | 5 | 4–5 |
| Washing Rating | 2–3 | 5 | 1 | 2 | 4 | 5 | 5 | 2–3 |

EXAMPLE 3

The antifouling coated panels were submerged in static lake fresh water containing plant spores and animal larvae from March through October. Table 3 shows the evaluation results of the samples.

TABLE 3

|  | Acrylic Resin | None | Sil Resin/ Sil Fluid | Silicone Rubber | Epoxy Tar | Decomposable Paint | Paraffin | Wax Polish |
| --- | --- | --- | --- | --- | --- | --- | --- | --- |
| Build Up Rating | 5 | 5 | 1 | 2 | 4 | 5 | 2 | 3 |

TABLE 3-continued

| | Acrylic Resin | None | Sil Resin/ Sil Fluid | Silicone Rubber | Epoxy Tar | Decomposable Paint | Paraffin | Wax Polish |
|---|---|---|---|---|---|---|---|---|
| Wash Rating | 3 | 4 | 1 | 2 | 3 | 3 | 2 | 2 |

Silicone fluids of about 60,000 mPas evaluated in a blend with the silicone resin at 1:6 wt ratio resin:fluid were not as effective.

It is hypothesized that in the present invention the silicone resin-silicone fluid mixtures function by the silicone resin forming a bonded layer to the substrate surface. The smoother the substrate, the more easily is effected a continuous film of resin. Adhesion is most easily effected to a polyurethane coating that has been preapplied to the substrate, for example the ship hull. The resin functions as the base coat. The silicone fluid forms a liquid interface on top of the resin layer and surrounding the submerged ship hull. The silicone fluids are known to have an extremely low surface tension. It is therefore extremely difficult for microorganisms to find an angle of attachment to this liquid interface and if attachment does occur any movement or washing mechanism will quickly remove the organisms. With a total reduction in microorganisms attached to the ship hull, there is a concomitant reduction in succeeding macroorganisms attachment.

STATEMENT OF INDUSTRIAL APPLICATION

A silicone based antifouling coating composition is provided to retard marine buildup on submerged surfaces.

We claim:

1. In a method for preventing or reducing the marine life buildup on a submerged surface by applying an antifouling coating to the surface, the improvement which comprises applying a silicone-containing coating consisting essentially of 5 to 40 wt % of a silicone resin which is a three dimensional, crosslinked, trifunctional siloxane and 60 to 95 wt % of a silicone fluid which is a polymeric difunctional siloxane.

2. The method of claim 1 in which the silicone resin is composed of crosslinked trifunctional molecules having the formula VII

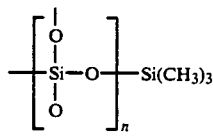

VII where n is an integer and the molar ratio of (CH$_3$)$_3$Si/SiO$_3$ is from 1.2 to 2.2

3. The method of claim 1 in which the silicone fluid is selected from the group consisting of silicone fluids having the following formulas:

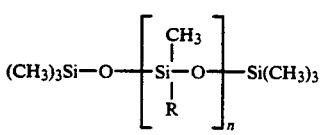

I where R is a C$_1$–C$_5$ alkyl, vinyl or C$_6$ aryl, n is from 2 to 1500 and the fluid has a viscosity from 10 to 500,000 mPas;

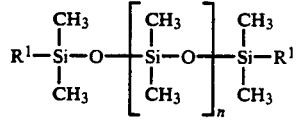

III where R$^1$ is a hydride, halide, C$_1$–C$_5$ alkyl, phenyl, benzyl, or an amino functional radical, n is from 20 to 5000 and the fluid has a viscosity from 20 to 1000 mPas;

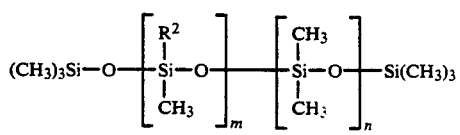

IV where R$^2$ is a hydride, halide, C$_1$–C$_5$ alkyl, phenyl, benzyl, or haloorganic radical, m is from 1 to 50, n is from 20 to 5000 and the fluid has a viscosity from 20 to 1000 mPas; and $$[(CH_3)_2SiO]_n \quad \text{V}$$

where n is 3 to 8 and the fluid has a viscosity from 2 to 10 mPas.

4. The method of claim 2 in which the silicone fluid has the following formula I:

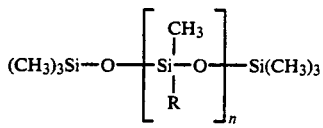

I where R is a C$_1$–C$_5$ alkyl, vinyl or C$_6$ aryl, n is from 2 to 1500 and the fluid has a viscosity from 10 to 500,000 mPas.

5. The method of claim 1 in which the silicone fluid has the following formula I

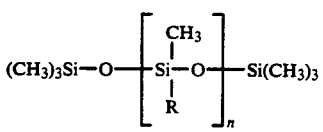

I where R is methyl or phenyl, n is from 90 to 800 and the fluid has a viscosity ranging from 10 to 3500 mPas.

6. The method of claim 1 in which the silicone-containing coating consists essentially of 10 to 25 wt % silicone resin and 75 to 90 wt % silicone fluid.

7. The method of claim 1 in which the silicone-containing coating is applied in a carrier solvent.

8. In a method for preventing or reducing the marine life buildup on a submerged surface by applying an antifouling coating to the surface, the improvement which comprises applying a silicone-containing coating consisting essentially of 5 to 40 wt % silicone resin which is composed of crosslinked trifunctional molecules having the formula VII

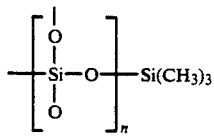

where n is an integer and the molar ratio of $(CH_3)_3Si/SiO_3$ is from 1.2 to 2.2, and 60 to 95 wt % silicone fluid which has the following formula I

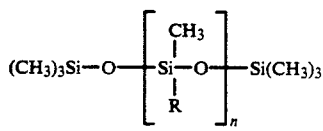

where R is methyl or phenyl, n is from 90 to 800 and the fluid has a viscosity ranging from 10 to 3500 mPas.

9. The method of claim 8 in which the silicone-containing coating consists essentially of 10 to 25 wt % silicone resin and 75 to 90 wt % silicone fluid.

10. The method of claim 9 in which the silicone-containing coating is applied to a substrate having a polyurethane or epoxy precoating.

11. The method of claim 10 in which the silicone-containing coating is applied in a carrier solvent.

12. An antifouling coating composition consisting essentially of 5 to 40 wt % siloxane resin having a three dimensional matrix and composed of crosslinked trifunctional molecules having the formula VII

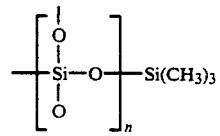

where n is an integer and the molar ratio of $(CH_3)_3Si/SiO_3$ is from 1.2 to 2.2, and 60 to 95 wt % polymeric difunctional silicone fluid interspersed within the resin matrix such that the fluid leaches out over time to provide a liquid laminar layer.

13. The coating composition of claim 12 in which the silicone fluid has the following formula I

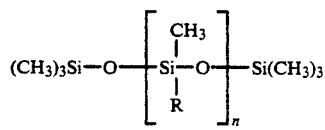

where R is methyl or phenyl, n is from 90 to 800 and the fluid has a viscosity ranging from 10 to 3500 mPas.

14. The coating composition of claim 13 in which R is methyl and viscosity of the fluid is 100 to 1000 mPas.

15. The coating composition of claim 14 in which the coating consists essentially of 10 to 25 wt % silicone resin and 75 to 90 wt % silicone fluid.

16. The coating composition of claim 14 in which the coating consists essentially of silicone resin and silicone fluid in a 1 to 6 wt ratio.

* * * * *